United States Patent
Davids et al.

(10) Patent No.: US 7,547,132 B2
(45) Date of Patent: Jun. 16, 2009

(54) SCREW-TYPE PROCESSING PLANT WITH ELONGATION AND EXPANSION COMPENSATION DEVICES

(75) Inventors: Ralf Davids, Illingen (DE); Carsten Koberg, Korntal (DE); Raimund Schleicher, Marbach (DE); Ralf Riehle, Dusslingen (DE)

(73) Assignee: Coperion GmbH, Stuttgart (DE)

( * ) Notice: Subject to any disclaimer, the term of this patent is extended or adjusted under 35 U.S.C. 154(b) by 0 days.

(21) Appl. No.: 11/934,548

(22) Filed: Nov. 2, 2007

(65) Prior Publication Data

US 2008/0124420 A1 May 29, 2008

(30) Foreign Application Priority Data

Nov. 23, 2006 (EP) ............................... 06024254

(51) Int. Cl.
*B29B 7/46* (2006.01)
*B29C 47/50* (2006.01)
(52) U.S. Cl. ........................................ 366/91; 366/290
(58) Field of Classification Search ................... 366/79, 366/83–86, 96–99, 91, 290–291, 318; 425/204, 425/205, 208; 285/179
See application file for complete search history.

(56) References Cited

U.S. PATENT DOCUMENTS

| | | | | |
|---|---|---|---|---|
| 2,455,945 A | * | 12/1948 | North et al. | 366/291 |
| 3,609,828 A | * | 10/1971 | Compa et al. | 425/131.1 |
| 3,860,220 A | * | 1/1975 | Matsubayashi et al. | 366/86 |
| 3,891,365 A | * | 6/1975 | Fischer | 425/131.1 |
| 4,068,863 A | * | 1/1978 | Lasko | 285/39 |
| 4,127,372 A | * | 11/1978 | Perla et al. | 425/131.1 |
| 4,473,299 A | * | 9/1984 | Guibert | 366/76.4 |
| 4,490,046 A | * | 12/1984 | Guibert | 366/76.4 |
| 5,865,472 A | * | 2/1999 | Freynhofer | 285/41 |
| 7,264,460 B2 | * | 9/2007 | Munz et al. | 425/205 |
| 7,438,550 B2 | * | 10/2008 | Munz | 425/205 |
| 2006/0076705 A1 | | 4/2006 | Fowler et al. | |
| 2006/0233903 A1 | * | 10/2006 | Munz | 425/225 |
| 2006/0240133 A1 | * | 10/2006 | Munz et al. | 425/205 |
| 2006/0245294 A1 | * | 11/2006 | Burkhardt | 366/85 |
| 2007/0104814 A1 | * | 5/2007 | Munz et al. | 425/205 |
| 2008/0124420 A1 | * | 5/2008 | Davids et al. | 425/204 |

FOREIGN PATENT DOCUMENTS

DE 2304088 1/1993
DE 4411164 C1 * 5/1995

(Continued)

OTHER PUBLICATIONS

European Search Report EP 06 02 4254, dated Apr. 2007.

*Primary Examiner*—Charles E Cooley
(74) *Attorney, Agent, or Firm*—James Conte

(57) ABSTRACT

A material processing plant consists of a first screw-type machine and a second screw-type machine: The screw-type machines are connected to each other by means of a pipe elbow. An elongation compensation device is disposed between the first screw-type machine and the pipe elbow. An expansion compensation device for thermal expansion of the second screw-type machine is disposed inside the last column of the first screw-type machine which is arranged upstream of the pipe elbow.

5 Claims, 3 Drawing Sheets

FOREIGN PATENT DOCUMENTS

| | | |
|---|---|---|
| DE | 195 44 165 A1 | 5/1997 |
| DE | 19544165 A1 * | 5/1997 |
| EP | 1 536 542 | 12/1978 |
| EP | 416859 A1 * | 3/1991 |
| EP | 694376 A2 * | 1/1996 |
| EP | 0 849 065 A1 | 6/1998 |
| EP | 1 005 411 B1 | 8/1998 |
| GB | 1 315 661 | 5/1973 |
| JP | 61266222 A * | 11/1986 |
| JP | 10109349 A * | 4/1998 |
| WO | WO 2004/106031 A1 | 9/2004 |

\* cited by examiner

SCREW-TYPE PROCESSING PLANT WITH ELONGATION AND EXPANSION COMPENSATION DEVICES

BACKGROUND OF THE INVENTION

1. Field of the Invention

The invention relates to a material processing plant comprising a first screw-type machine which is provided with a first casing, at least one first casing bore having a first axis, a first screw shaft disposed in the at least one first casing bore, a first feeding area for material to be processed, with said first feeding area projecting into the first casing bore at a first end of the first casing, a first discharge area disposed at a second end of the first casing, and a column supporting the first casing in the area of the first discharge zone, a second screw-type machine which is provided with a second casing disposed below the first casing, at least one second casing bore having a second axis, a second screw shaft disposed in the second casing bore, a second feeding area projecting into the second casing bore at a first end of the second casing, and a second discharge area disposed at a second end of the second casing, and a pipe elbow which connects the first discharge area to the second feeding area, is connected to the first screw-type machine by means of an elongation compensation device, and is connected to the second casing.

2. Background Art

In particular in the processing of plastics, it is often reasonable to provide two successive extruders, each of which performing individual processing steps. For example, when plastic material is used in the form of powder, inlet and melting of the powder can take place in a first extruder. Homogenizing and pressure build-up then takes place in a second, downstream extruder. Such successive arrangements of several extruders are known for example from EP 1 005 411 B1, U.S. Pat. Nos. 3,261,056 A, 3,860,220 A, and US 2007/0104814 A1. Most plants of the generic type known from literature and practice face problems resulting from high thermal expansion when heating up during start-up which may lead to considerable stress in the entire system.

Therefore, it is the object of the invention to develop a plant of the generic type in a way to prevent damages to the plant due to thermal elongation and expansion.

This object is attained in accordance with the invention by an expansion compensation device being provided between the column and the first casing.

According to the invention, it is thus provided, on the one hand, an elongation compensation device between the first extruder and the pipe elbow and, on the other hand, an expansion compensation device between the support adjoining the discharge area of the first extruder and the casing of said support. Compensation of expansion of the second extruder thus occurs between the casing of the first extruder and said support.

According to the embodiment of a plant wherein the expansion compensation device is configured as a slide bearing provided with a sliding surface which slopes up towards the axis in the first direction of flow, compensation of thermal expansions of the second casing of the second extruder occurs in a given, fixed relation to the elongation of the first casing of the first extruder, said relation being obtained empirically or by means of calculation.

A plant wherein the sliding surface is formed between two wedges of which a lower wedge is connected to the columns and an upper wedge is connected to the first casing, and a plant wherein the sliding surface forms an angle ($\alpha$) with the first axis, whereby $0.15 \leq \tangent \alpha \leq 0.25$, and in particular tangent $\alpha \approx 0.24$, specify advantageous embodiments thereof.

A plant wherein the elongation compensation device is configured as a sliding sleeve specifies an advantageous embodiment of the elongation compensation device.

Further advantages, features and details of the invention will become apparent from the ensuing description of an exemplified embodiment when taken in conjunction with the drawing.

DESCRIPTION OF THE PREFERRED EMBODIMENT

Figure 1:
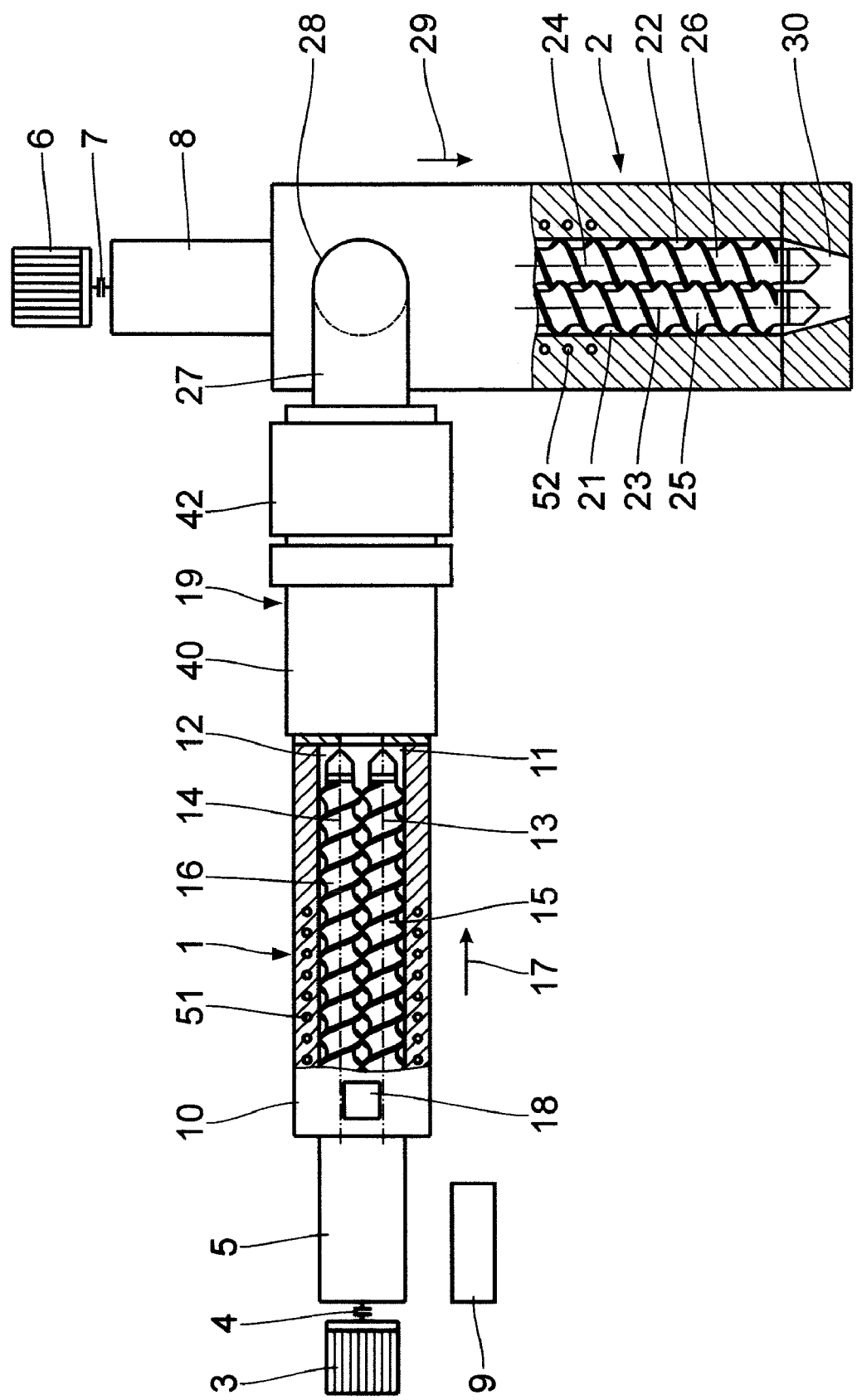
FIG. 1 is a schematic, partially open, plan view of a plant according to the invention.

The cascade-type extruder displayed in the drawing is provided with a first extruder 1 and a second extruder 2, i.e. screw-type machines. The first extruder 1 is disposed above the second extruder 2 (see FIG. 2). The first extruder 1 is actuated by means of a first motor 3 via a first coupling 4 and a first transmission 5. The second extruder 2 is actuated by means of a second motor 6 via a second coupling 7 and a second transmission 8. Control of the motors 3 and 6 takes place by means of a control unit 9. The extruders 1, 2 are immovably secured to the respective transmissions 5, 8 of said extruders 1, 2 in the longitudinal direction.

The first extruder 1 is provided with a casing 10 in which two first casing bores 11, 12 are formed which are provided with parallel axes 13, 14, said axes 13, 14 being aligned parallel to each other in an approximately figure-eight-type engagement. These casing bores 11, 12 are provided with two first screw shafts 15, 16 which are coupled to the first transmission 5. The screw shafts 15, 16 are driven in the same or opposite directions. The first extruder 1 is provided with a first feeding area 18 for materials to be processed which is disposed downstream of the first transmission 5 in a first direction of flow 17, and is adjoined by one or more processing areas in the direction of flow 17.

A first discharge area 19, where discharge occurs in the first direction of flow 17, is provided at the end of the first extruder 1. Instead of two casing bores 11, 12 and, correspondingly, two screw shafts 15, 16, it is also possible to have only one bore, or three or more bores, and a corresponding number of screw shafts.

The second extruder 2 is also provided with a casing 20 in which two second casing bores 21, 22 with parallel axes 23, 24 are formed, said casing bores engaging with each other, thus also defining a figure-eight-type cross-sectional shape. Two second screw shafts 25, 26 are disposed in the second casing bores 21, 22, said second screw shafts 25, 26 being rotatably drivable in the same or opposite directions and being coupled to the second transmission 8.

The first extruder 1 is connected to the second extruder 2 by means of a pipe elbow 27 adjoining the discharge zone 19 of said first extruder 1, with the pipe elbow 27 projecting into the second extruder 2 in a second feeding area 28. The pipe elbow 27 is securely fixed to the upper side of the second housing 20. The feeding area 28 is in turn adjoined by one or more processing areas. The second extruder 2 has a second discharge area 30 disposed downstream in a second direction of flow 29 at the opposite end of the feeding area 28.

It is also true for the second extruder 2 that it can be provided with only one or more than two casing bores as well as a corresponding number of screw shafts.

Figure 2:
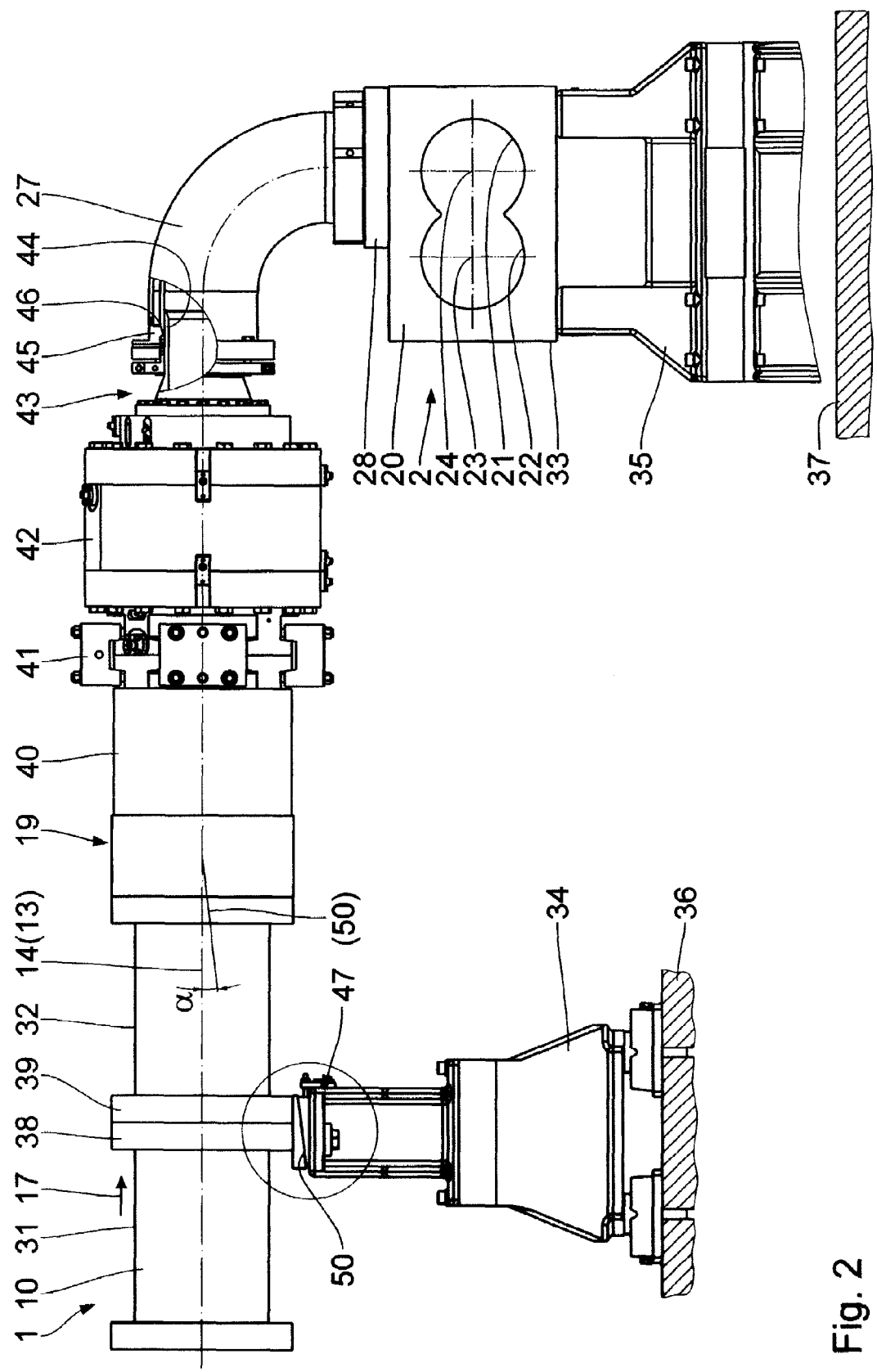
FIG. 2 is a partially open and, compared to FIG. 1, detailed partial lateral view of the plant according to FIG. 1.
Figure 3:
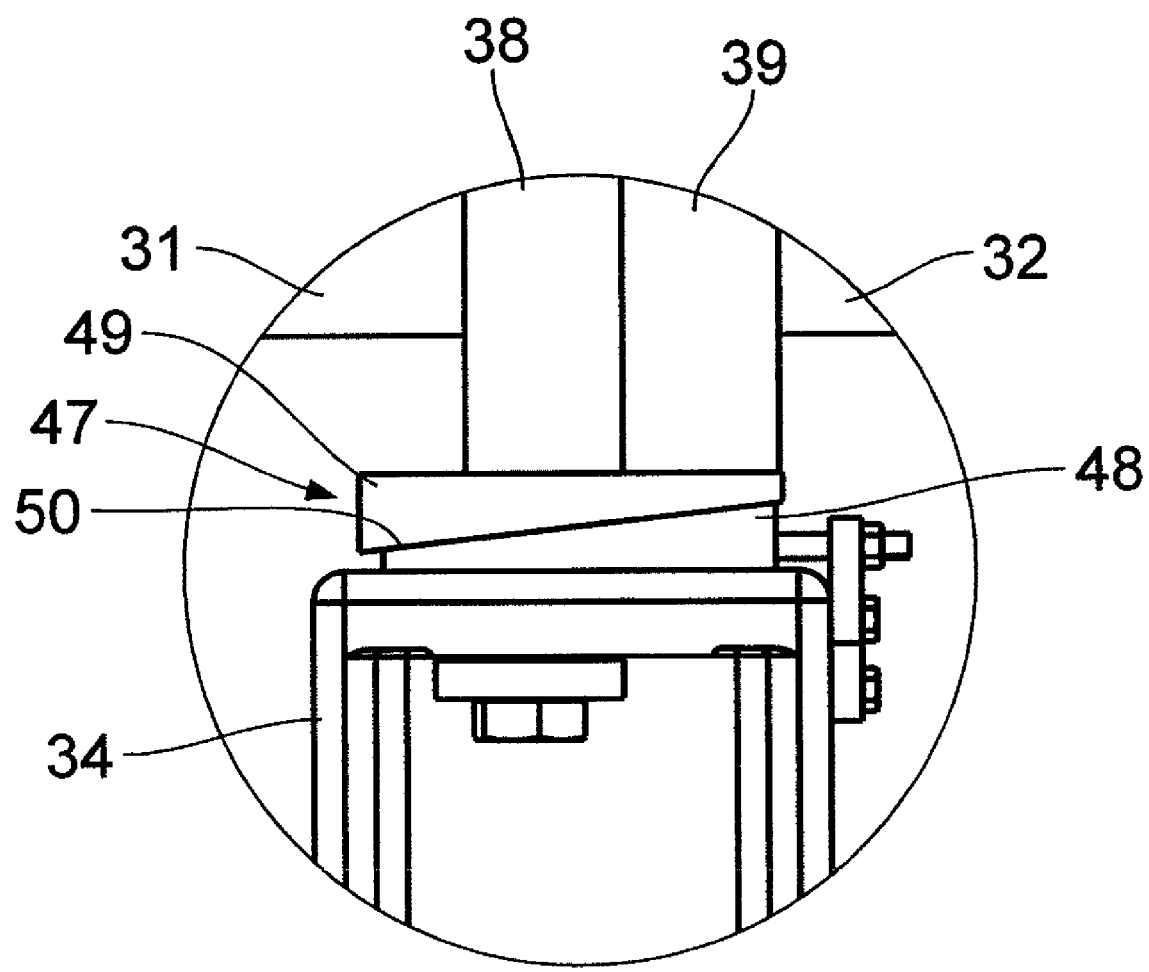
FIG. 3 is an enlarged partial view of the expansion compensation device of FIG. 2.

As can be seen in FIG. 2, the first casing 10 is composed of individual casing sections in the conventional manner, with only the last two casing sections 31, 32 being displayed. Accordingly, the same applies to the second casing 20, whereby only one casing section 33 is displayed. Both the first casing 10 and the second casing 20 are supported on foundations 36, 37 via columns 34, 35, with one column 34 or 35 of each casing 10, 20 being indicated in FIG. 2. The column 34, which forms the essential part within the scope of the invention, is arranged below the connection flanges 38, 39 by means of which the last two casing sections 31, 32 of the first casing 10 are connected to each other. This column 34 of the first extruder 1 is thus the nearest adjacent column with respect to the pipe elbow 27; when seen in the first direction of flow 17, it is located directly upstream of the first discharge area 19 of the first extruder 1. The casing section 32, which is the last in a row when seen in the first direction of flow 17, is adjoined by a start-up control device 40 to which a filter casing 42, together with a filter, is connected by means of a flange 41. The filter 42 is then adjoined by said pipe elbow 27 which extends over a quarter circle and is thus bent at 90°, i.e. facing away from the horizontal direction of the axes 13, 14. In general, all axes 13, 14 as well as 23, 24 extend horizontally, said axes 13, 14 thus being directed away from the horizontal, and vertically downward towards the second extruder 2 which is disposed at a correspondingly lower position, and whose second feeding area 28 is disposed on the upper face of said extruder 2.

Furthermore, an elongation compensation device 43 is provided between the filter casing 42 and the pipe elbow 27 to compensate for thermal elongations of the first extruder 1. These elongations originate from the transmission 5. The device 43 consists in principle of a sliding-sleeve connection, with a tubular sliding sleeve 44 being arranged at the filter casing 42, said tubular sliding sleeve 44 engaging with a straight pipe section 45 of the pipe elbow 27, and a sealing member 46 provided between the two. The first casing 10 can thus expand longitudinally in the direction of the first axes 13, 14, without the pipe elbow 27 being displaced in the direction of the first axes 13, 14. These elongations of the first housing 10, together with the start-up control device 40 and the filter casing 42, only result in relative displacements of the sliding sleeve 44 towards the pipe section 45, without the pipe elbow 27 itself being displaced.

When the extruders 1, 2 heat up, the second casing 20 of said second extruder 2 also expands perpendicularly to the direction of the axes 23, 24, i.e. upwards, since the vertical position of the second foundation 37 and column 35 is unchangeable. This upward expansion causes the pipe elbow 27 to be displaced upward and perpendicularly to the direction of the axes 13, 14. In order to compensate for this thermal expansion, provision is made for an expansion compensation device 47 which is disposed between the column 34 of the first extruder 1 and the first casing 10. Said expansion compensation device substantially consists of two flat wedges of which a first lower wedge 48 is disposed on the column 34 while a second upper wedge 49 bears against the first casing 10, more precisely against the connection flanges 38, 39 of the casing sections 31, 32, and is connected to said connection flanges 38, 39. The two wedges 48, 49 bear against each other forming a sliding surface 50 which, when seen in the first direction of flow 17, slopes up towards the pipe elbow 27, or towards the first discharge area 19, respectively. When seen in the first direction of flow 17, sliding surface 50 thus slopes up towards the plane spanned by the axes 13, 14.

When the first extruder 1 and the second extruder 2 are heated up by means of, for example, the heating systems 51, 52 during the start-up process, the first extruder 1 expands longitudinally towards the discharge area 19 of said first extruder 1. When this happens, the second upper wedge 49, which is connected to the first casing 10, slides over the lower wedge 48 which is non-displaceable in the direction of the axes 13, 14, thus causing the first casing 10 to be moved upward in this area and, correspondingly, also in the area of transition to the pipe elbow 27. The inclination angle a of the sliding surface 50, with respect to the first axes 13, 14, is chosen in a way that the thermal elongation occurring during normal operation translates into a correspondingly lower thermal expansion of the second extruder 2. In large machines, thermal expansion of the first extruder 1 occurring during the operation is in the range of 15 mm while thermal expansion of the second extruder 2 may be in the range of 3 mm. In this case, the angle a is chosen to ensure that the following applies: tangent $\alpha \approx 0.2$. Approximately the following applies to all situations occurring in practice: $0.15 \leq \tan\text{gent } \alpha \leq 0.25$.

What is claimed is:

1. A material processing plant, comprising
   a first screw-type machine provided with
   a first casing (10),
   at least one first casing bore (11, 12) provided with a first axis (13, 14),
   a first screw shaft (15, 16) disposed in the at least one first casing bore (11, 12),
   a first feeding area for material to be processed, said first feeding area projecting into the first casing bore (11, 12) at a first end of the first casing (10),
   a first discharge area (19) disposed at a second end of the first casing (10), downstream in a first direction of flow (17) of the first feeding area, and
   a column (34) supporting the first casing (10) in the area of the first discharge area (19),
   a second screw-type machine provided with
   a second casing (20) disposed below the first casing (10),
   at least one second casing bore (21, 22) provided with a second axis (23, 24),
   a second screw shaft (25, 26) disposed in the second casing bore (21, 22),
   a second feeding area (28) projecting into the second casing bore (21, 22) at a first end of the second casing (20), and
   a second discharge area (30) disposed at a second end of the second casing (20),
   a pipe elbow (27) which connects the first discharge area (19) to the second feeding area (28), is connected to the first screw-type machine by means of an elongation compensation device (43), compensating elongations of the first casing (10) relative to the second casing (20), and
   is connected to the second casing (20), and
   an expansion compensation device (47) provided between the column (34) and the first casing (10) compensating expansions of the second casing (20) upward and perpendicular to the second axis (23, 24) by displacing the first casing perpendicular to the first axis (13, 14) and the second axis (23, 24) wherein the expansion compensation device (47) is a slide bearing provided with a sliding surface (50) which slopes up towards the first axis (13) in the first direction of flow (17) and wherein the sliding surface (50) is formed between two wedges (48, 49) of which a lower wedge (48) is connected to the column (34) and an upper wedge (49) is connected to the first casing (10).

2. A plant according to claim 1, wherein the sliding surface (50) forms an angle ($\alpha$) with the first axis (13, 14), whereby $0.15 \leq \tangent \alpha \leq 0.25$.

3. A plant according to claim 2, wherein the sliding surface (50) forms an angle ($\alpha$) with the first axis (13, 14), whereby tangent $\alpha \approx 0.2$.

4. A plant according to claim 1, wherein the elongation compensation device (43) is configured as a sliding sleeve (44).

5. A plant according to claim 4 wherein the elongation compensation device is between a filter casing (42) and has the sliding sleeve (44) engaging with a straight pipe section (45) of the pipe elbow and a sealing member (46) provided between the sliding sleeve and the straight pipe section.

* * * * *